UNITED STATES PATENT OFFICE 2,565,141

THERMAL STABILIZATION OF POLYMERIC METHYL METHACRYLATE

Barnard Mitchel Marks, Newark, N. J., assignor to E. I. du Pont de Nemours & Company, Wilmington, Del., a corporation of Delaware No Drawing. Application August 26, 1949, Serial No. 112,643

12 Claims. (Cl. 260—45.7)

This invention relates to the thermal stabilization of polymeric methyl methacrylate and, more particularly, to the production of methyl methacrylate molding powder of improved thermal stability.

Methyl methacrylate molding powder has been prepared commercially for some years by the so-called granular polymerization process wherein the monomer suspended in an aqueous vehicle is polymerized, usually by heat, in the presence of a polymerization catalyst and a granulating agent. The polymer is obtained in the form of granules generally too small to be used as molding powder although recently by regulation of conditions the granule size has been increased so that the polymer may be used as a molding powder without further treatment. If the polymer granules are too small, it is conventional to work the polymer on rolls into continuous form such as sheets and comminute the sheets to the desired particle size.

In the molding of methyl methacrylate molding powder, especially in injection molding, it is important that the molding powder possess good thermal stability, i. e., in practical language, a wider molding temperature range. Good thermal stability is becoming increasingly important because of the trend towards moldings of more massive proportions and the use of multiple cavity dies. In producing such moldings it is necessary to heat the molding powder to its maximum molding temperature, thereby increasing the fluidity of the polymer mass so that the mold can be completely filled before the polymer solidifies. Obviously, the molding powder with the highest thermal stability, that is, the one which may be heated to the highest temperature without decomposition or other harmful effect, has the best competitive position, other facts being equal.

Heretofore, various expedients have been used to improve the thermal stability of methyl methacrylate molding powder with varying success. Nevertheless, there still remains a great need in the art for a simple and economical process of obtaining methyl methacrylate molding powder of greater thermal stability.

An object of the present invention is to provide an improvement in the granular polymerization of methyl methacrylate whereby polymer of improved thermal stability may be economically obtained. A further object is to provide such an improvement which entails a minimum of additional processing even when the polymer granules formed are of sufficient size to be used directly as a molding powder. Other objects will be apparent from the description of the invention given hereinafter.

The above objects are accomplished according to the present invention by carrying out the granular polymerization of methyl methacrylate suspended in an aqueous vehicle in the presence of an aliphatic sulfide, and thereafter heating the resulting granular polymer at 100° C.–150° C. until said sulfide is actuated as a thermal stabilizer. More particularly, 0.01%–1.0%, by weight of the monomeric methyl methacrylate, of the sulfide is used, preferably, 0.1%–0.5% of an aliphatic sulfide of the formula R—S—R' wherein R and R' are alkyl radicals having at least four carbon atoms, and the granular polymer is heated at 125° C.–140° C.

The present invention resides to a considerable extent in the discovery that aliphatic sulfides may be added to the monomer suspension without interfering with the subsequent polymerization of the methyl methacrylate with the result that the sulfide is distributed throughout the polymer granules rather than merely on the surface and that, upon heating the polymer granules the sulfide, which up to this point is of no effect as a thermal stabilizer, is activated and exerts a strong stabilizing effect. Although temperatures above 100° C. are normally reached in the granular polymerization, the period of exposure to such temperature is not sufficient to activate the sulfide and, hence, it was a matter of surprise to discover these sulfides become powerful thermal stabilizers merely upon further heating.

By the use of aliphatic sulfides in accordance with this invention a methyl methacrylate molding powder of higher thermal stability than heretofore known may be obtained readily and economically with substantially no additional manipulation of apparatus or material.

The following examples, wherein all parts are by weight unless otherwise noted, illustrate specific embodiments of the invention.

Example 1

This illustrates the granular polymerization of methyl methacrylate in the presence of di-2-ethyl hexyl sulfide.

The following ingredients were charged into the reaction vessel:

| (a) | Parts |
|---|---|
| Distilled water | 250 |
| Disodium acid phosphate (buffer) | 4 |
| 1% aqueous solution of 65% sodium salt of polymethacrylic acid (granulating agent) | 5 |
| Sodium hypophosphite (anti-clustering agent) | 4 |

(b)

| | Parts |
|---|---|
| Methyl methacrylate monomer | 80 |
| Methyl methacrylate monomer to dissolve catalyst | 20 |

(c)

| | |
|---|---|
| "Lorol" mercaptan [1] (chain transfer agent) | 0.10 |
| Di-2-ethyl hexyl sulfide (stabilizer) | 0.50 |
| Alpha,alpha'-azodiisobutyronitrile (polymerization catalyst) | 0.25 |

[1] "Lorol" mercaptan used is a mixture of straight-chain (normal) mercaptans of even numbers of carbon atoms from 8 to 18, inclusive, with lauryl mercaptan preponderating.

The ingredients in (a) were dissolved together and charged into a stainless steel closed reaction kettle, fitted with a stainless steel stirrer, stainless steel baffles, thermocouple for observing the temperature of the contents, and an outlet through the head to a pressure gauge. The polymerization catalyst was dissolved in 20 parts of methyl methacrylate monomer, and the sulfide and the mercaptan listed in (c) were dissolved in the bulk of monomer. The resulting solutions were then charged into the reaction kettle, the kettle was sealed and the stirrer started. Steam was used to heat the contents of the kettle and, as the temperature of the contents rose to about 110° C., the steam was shut off. As the residual heat and the exothermic heat of polymerization raised the temperature to about 125° C., cold water was allowed to flow into the jacket surrounding the kettle.

After polymerization was completed, the polymer suspension was cooled, separated from the mother liquor, washed and dried. The granular polymer was then heat treated in a vacuum oven at a temperature in the neighborhood of 125° C. for about 16 hours.

The resulting granular polymer, which consisted of particles of suitable size for directly molding in an injection molding machine, was free of contamination by foreign particles and moldings produced therefrom were of exceptionally high clarity. It possessed unusual thermal stability by which is meant that the polymer has a wide molding temperature range, indicating that no decomposition occurred at the higher molding temperatures.

*Example II*

This also illustrates the granular polymerization of methyl methacrylate in the presence of di-2-ethyl hexyl sulfide.

The following ingredients were charged into the reaction vessel:

(a)

| | Parts |
|---|---|
| Distilled water | 2,300 |
| Disodium acid phosphate (buffer) | 40 |
| 1% aqueous solution of 65% sodium salt of polymethacrylic acid (granulating agent) | 58 |
| Sodium hypophosphite (anti-clustering agent) | 40 |

(b)

| | |
|---|---|
| Methyl methacrylate monomer | 830 |
| Methyl methacrylate monomer to dissolve catalyst | 50 |

(c)

| | |
|---|---|
| "Lorol" mercaptan (chain transfer agent) | 0.88 |
| Di-2-ethyl hexyl sulfide (stabilizer) | 4.58 |
| Alpha,alpha'-azodiisobutyronitrile (polymerization catalyst) | 2.20 |

The ingredients in (a) were dissolved together and charged into a reaction kettle as in Example I. Fifty parts of methyl methacrylate monomer were used to dissolve the catalyst, the sulfide and mercaptan listed in (c) were dissolved directly in the bulk of monomer, and the resulting solutions were added to the reaction kettle. The kettle was sealed and the stirrer started. Steam was used to heat the contents of the kettle; and as the temperature rose to about 110° C., the steam was shut off. As the residual heat and the exothermic heat of polymerization raised the temperature to about 125° C., cold water was allowed to flow into the jacket surrounding the kettle. After polymerization was completed, the suspension of polymer was cooled to room temperature; and thereafter the granular polymer was separated from the mother liquor, washed and dried.

The resulting granular polymer was heat treated in a vacuum oven at about 128° C. for a period of about 12 hours. The polymer particles were of such size that they were molded directly in an injection molding machine. The polymer was free of contamination by foreign particles and moldings were of exceptionally high clarity. The molding powder showed superior thermal stability.

*Example III*

This illustrates the granular polymerization of methyl methacrylate in the presence of n-butyl sulfide.

The following ingredients were charged into the reaction vessel:

(a)

| | Parts |
|---|---|
| Distilled water | 9,400 |
| Disodium acid phosphate (buffer) | 100 |
| 1% aqueous solution of 65% sodium salt of polymethacrylic acid (granulating agent) | 250 |
| Sodium hypophosphite (anti-clustering agent) | 100 |

(b)

| | |
|---|---|
| Methyl methacrylate monomer | 5,500 |

(c)

| | |
|---|---|
| n-Butyl sulfide (stabilizer) | 20 |
| Alpha,alpha' - azodiisobutyronitrile (poly(merization catalyst) | 22 |

The ingredients in (a) were dissolved together and charged into a glass-lined reaction kettle, fitted with a stainless steel stirrer, thermocouple for observing the temperature of the contents, and an outlet through the head to a pressure gauge. The catalyst was dissolved in a small quantity of the monomer, the n-butyl sulfide was dissolved directly in the bulk of the monomer, and the resulting solutions were charged into the reaction kettle. The kettle was sealed, and the stirrer started. Steam was used to heat the contents of the kettle, and as the temperature of the contents rose to about 110° C., the steam was shut off. As the residual heat and the exothermic heat of polymerization raised the temperature to about 125° C., cold water was allowed to flow into the jacket surrounding the kettle. After polymerization was completed, the suspension of polymer was cooled to room temperature; and thereafter the granular polymer was separated from the mother liquor, washed and dried.

The resulting granular polymer was heat treated in a vacuum oven at about 128° C. for a period of about 12 hours. The polymer was free of contamination by foreign particles, and mouldings were of exceptionally high clarity. The molding powder showed superior thermal stability.

Example IV

This illustrates the granular polymerization of methyl methacrylate in the presence of n-butyl lauryl sulfide.

The following ingredients were charged into the reaction vessel:

(a)

| | Parts |
|---|---|
| Distilled water | 10,600 |
| Disodium acid phosphate (buffer) | 100 |
| 1% aqueous solution of 65% sodium salt of polymethacrylic acid (granulating agent) | 385 |
| Sodium hypophosphite (anti-clustering agent) | 150 |

(b)

| | |
|---|---|
| Methyl methacrylate monomer | 4,200 |
| Methyl methacrylate monomer to dissolve catalyst | 100 |

(c)

| | |
|---|---|
| "Lorol" mercaptan (chain transfer agent) | 4.3 |
| n-Butyl lauryl sulfide (stabilizer) | 9 |
| Alpha, alpha' - azodiisobutyronitrile (polymerization catalyst) | 10.75 |

The ingredients in (a) were dissolved together and charged into a reaction kettle as in Example III. The catalyst was dissolved in 100 parts of the monomer, the sulfide and the mercaptan listed in (c) were dissolved directly in the bulk of monomer, and the resulting solutions were added to the reaction kettle. The kettle was sealed and the stirrer started. Steam was used to heat the contents of the kettle; and as the temperature rose to about 110° C., the steam was shut off. As the residual heat and the exothermic heat of polymerization raised the temperature to about 125° C., cold water was allowed to flow into the jacket surrounding the kettle. After polymerization was completed, the suspension of polymer was cooled to room temperature; and thereafter the granular polymer was separated from the mother liquor, washed and dried.

The resulting granular polymer was heat treated in a vacuum oven at a temperature between 125° C. and 128° C. for a period of about 12 hours. The polymer was free of contamination by foreign particles, and moldings were of exceptionally high clarity. The molding powder showed superior thermal stability.

Example V

The procedure of Example IV was repeated except that di-n-octyl sulfide was substituted for n-butyl lauryl sulfide.

The resulting granular polymer was of quality equal to that in Example IV and possessed superior thermal stability.

Example VI

The procedure in Example IV was repeated except that tertiary-octyl-n-butyl sulfide was substituted for n-butyl lauryl sulfide.

The resulting granular polymer was equal to that of Example IV in quality and thermal stability.

Example VII

The procedure in Example IV was repeated except that 12.9 parts of isobutyl sulfide were substituted for the 9 parts of n-butyl lauryl sulfide used in Example IV.

The resulting polymer was equal to that of Example IV in quality and thermal stability.

Example VIII

This illustrates the granular polymerization of methyl methacrylate in the presence of di-2-ethyl hexyl sulfide followed by heat treatment in a liquid medium.

The following ingredients were charged into the reaction vessel:

(a)

| | Parts |
|---|---|
| Demineralized water | 150 |
| Disodium acid phosphate (buffer) | 2 |
| 1% aqueous solution of 65% sodium salt of polymethacrylic acid (granulating agent) | 3.3 |
| Sodium hypophosphite (anti-clustering agent) | 2 |

(b)

| | |
|---|---|
| Methyl methacrylate monomer | 45 |
| Methyl methacrylate monomer to dissolve catalyst | 10 |

(c)

| | |
|---|---|
| "Lorol" mercaptan (chain transfer agent) | 0.055 |
| Di-2-ethyl hexyl sulfide (stabilizer) | 0.275 |
| Alpha,alpha'-azodiisobutyronitrile (polymerization catalyst) | 0.138 |

The ingredients in (a) were dissolved together and charged into a reaction kettle as in Example I. The catalyst was dissolved in 10 parts of the monomer, the sulfide and the mercaptan listed in (c) were dissolved directly to the bulk of the monomer, and the resulting solutions were added to the reaction kettle. The kettle was sealed and the stirrer started. Steam was used to heat the contents of the kettle; and as the temperature rose to about 110° C., the steam was shut off. The residual heat and the exothermic heat of polymerization raised the temperature to a peak of about 125° C., and following the peak temperature the polymerization was substantially complete. Thereafter, additional steam was used to raise the temperature of the polymer suspension to a temeprature of about 140° C. This temperature was maintained for a period of about 3 hours, and following this heat treatment the kettle was vented for about 5 minutes to remove volatiles.

Following heat treatment, the polymer suspension was cooled to room temperature, separated from the mother liquor, washed and dried.

The resulting molding powder was equal in quality and thermal stability to that of the preceding examples.

It will be understood that the above examples are merely illustrative and that the invention broadly comprises carrying out the granular polymerization of methyl methacrylate in the presence of an aliphatic monosulfide and thereafter heating the resulting granular polymer at 100° C.–150° C. until the sulfide is activated as a thermal stabilizer.

The aliphatic monosulfides as a class are suitable for use in the invention. These sulfides have the formula R—S—R' wherein R and R' are alkyl radicals, either alike or dissimilar. The higher boiling sulfides such as those wherein R and R' are radicals containing at least 4 carbon atoms, are preferred, with di-2-ethyl hexyl sulfide the preferred specific sulfide because it requires less heating to obtain maximum stability. Other suitable sulfides include dimethyl sulfide, diethyl sulfide, di-n-propyl sulfide, di-n-butyl sulfide, di-iso-butyl sulfide, di-n-heptyl sulfide, di-n-octyl sulfide, n-butyl lauryl sulfide, and tertiary-octyl-n-butyl sulfide. The higher boiling sulfides such as di-n-butyl sulfide and di-2-ethyl hexyl sulfide provide optimum stability, and these are in general preferred over the low-boiling compounds.

The proportion of monosulfide used is not sharply critical and normally will be used in the range of 0.01%–1.0%. No practical reason is known why these limits should be exceeded although they may be without rendering the process inoperative. It is preferred to use the monosulfide in the proportion of 0.1%–0.5%. The percentages given are based on the weight of polymerizable monomer present and this will usually be entirely methyl methacrylate but other monomers may be present up to 20% by weight of the methyl methacrylate.

The key to this invention is the step of heating the polymer granules. Although the temperature during polymerization will usually rise above 100° C., it is hardly above such temperature more than momentarily, rarely as long as 15 minutes. Such brief heating is not sufficient to activate the sulfide as a thermal stabilizer.

In order to determine whether the polymer granules have been heated sufficiently to take advantage of the invention, the thermal stability of the polymer after treatment should be ascertained. This may be done by direct testing such as a determination of weight loss of the polymer upon heating at elevated temperatures and reduced pressures, or by molding the polymer in a conventional injection molding machine at various elevated temperature levels and comparing the general optical properties of such moldings with those molded from known molding powders of good thermal stability. A practical test for thermal stability of the molding powder comprises heating samples at 155° C. and 235° C. at about 3 mm. pressure for 2½ hours. At the end of that time, the loss in weight of the polymer is calculated as percent of the original weight, and the percent weight loss at 155° C. is subtracted from the percent weight loss at 235° C. If the resulting difference is between about 1% and 10%, the molding powder is of excellent thermal stability according to today's standards. Molding powders showing differences in percent weight loss at the two temperatures running more than 10% are not considered satisfactory, at least according to standards now possible through the treatment of the present invention.

To utilize the present invention the polymer granules must be heated sufficiently to activate the sulfide as a thermal stabilizer; moreover, preferably and normally, the heating is continued until maximum stability is obtained as indicated by the test above or other tests accurately gauging the normal stability. The optimum heat treatment for polymer granules in the presence of any given sulfide will depend primarily upon two factors, namely, the temperature and the duration of the heating. Ideally, the optimum heat treatment would be at the maximum temperature that avoided any difficulties and for just the duration which gave maximum thermal stability. While it is good practice to establish such conditions in plant operations by preliminary testing, it is not necessary to carry out the heat treatment under optimum conditions and advantage of the present invention may be taken even if the heat treatment is not sufficient to give the maximum stability.

Heating of the polymer granules should be carried out between 100° C. and 150° C.; below 100° C., the duration of the heating must be so prolonged to activate the sulfide that it is not economically feasible while above 150° C. substantial depolymerization of the polymer occurs. The preferred temperature range is between 125° C. and 140° C. Since the sulfide is activated more quickly at higher temperatures, temperatures approaching 150° C. are advantageous in reducing the time required to obtain maximum thermal stability but the tendency of the polymer granules to soften and to adhere to each other as the temperature increases must be taken into consideration.

If the polymer granules are heated in a tray placed in an oven, comparatively low temperatures below about 125° C. must be used to avoid adherence of the particles to each other. On the other hand, if a rotary dryer which constantly agitates the granules, is employed, considerably higher temperatures can be used without danger of the granules adhering. If the granules are treated in an aqueous medium, a very advantageous procedure illustrated in Example VIII, then there is even less tendency of the granules to adhere and temperatures running up to 150° C. may be used. This is also true if the polymer is heated on rolls; in this case, the polymer is obtained in continuous form which requires subsequent comminution but rolls would normally be used at any rate if modifiers and the like were to be incorporated.

The duration of the heating to attain maximum thermal stability at a given temperature will depend upon the specific monosulfide used, di-2-ethyl hexyl sulfide being outstanding in that it requires a shorter heat treatment than the other sulfides. To illustrate, a methyl methacrylate polymer composition polymerized in the presence of n-butyl sulfide required about seven hours heat treatment at 125° C. to attain maximum stability and about six hours at 130° C. By comparison, when di-2-ethyl hexyl sulfide was used, only four hours heat treatment was required at 125° C. and two hours at 130° C. It will be evident that in the foregoing examples, the duration of the heat treatment substantially exceeded the actual time necessary to attain maximum thermal stability and this is primarily due to the fact that additional time was required for the total quantity of polymer to be brought to the actual temperature of the oven. Obviously, the overall time of heat treatment will vary with the mode of heat treatment, the time being greatly reduced where the procedure of Example VIII is followed, i. e., continuing the heating of the aqueous vehicle in which the polymer was formed. While it is not feasible to set mathematical limits on the duration of the heat treatment as it will vary so because of a number of factors, it is relatively simple to determine a practical heat treatment in any given instance by determining the heat stability of the polymer at the end of various periods of heating.

The invention is primarily directed to the treatment of methyl methacrylate polymer but is not restricted to the homopolymer. That is, the invention is equally applicable to polymers consisting of methyl methacrylate copolymerized with up to 20%, by weight of the methyl methacrylate monomer, of other monomeric polymerizable liquid organic compounds. Various polymerizable liquid organic compounds or mixtures thereof which may be copolymerized with methyl methacrylate include such other esters of methacrylic acid as ethyl methacrylate, butyl methacrylate, and isobutyl methacrylate; esters of acrylic acid such as methyl acrylate, ethyl acrylate, and butyl acrylate; styrene; vinyl acetate and vinyl chloride.

The present invention is not dependent upon the particular procedure used for carrying out the granular polymerization of the methyl methacrylate in the aqueous vehicle, this operation in general being well known in the art. A polymerization catalyst is used and this advantageously may be an azo compound as illustrated in the examples. These azo compounds are disclosed in Hunt U. S. Patent 2,471,539 and may be generally characterized as organic azo compounds containing an acyclic azo, —N=N—, group having bonded to each nitrogen a discrete carbon atom of the class of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen. They include alpha,alpha'-azodiisobutyronitrile, dimethyl alpha, alpha'-azodiisobutyrate; diethyl-alpha,alpha' - azodiisobutyrate; alpha, alpha' - azodicyclohexanecarbonitrile, alpha and alpha'-azobis (alpha,gamma - dimethyl - valeronitrile). Other polymerization catalysts which may be used in this invention include such catalysts as benzoyl peroxide, lauroyl peroxide, acetyl benzoyl peroxide, diacetyl peroxide, p - tertiary - butyl perbenzoate, tertiary-butyl-perlaurate, di-tertiary-butyl peroxide, di-tertiary-butyl peroxybutane, tertiary-butyl undecylenate, and tertiary-butyl percrotonate.

In order to obtain the polymer in the form of granules in the granular polymerization process, a granulating agent is added to the aqueous vehicle. The sodium salt of polymethacrylic acid used in the examples is a highly satisfactory granulating agent where the monomer is methyl methacrylate although many other granulating agents are known in the prior art and may be used.

The use of an anti-clustering agent such as described in applicant's copending application Ser. No. 100,540 filed June 21, 1949, is highly advantageous. Such anti-clustering agents are sodium and potassium hypophosphites which are normally used in the proportion of 0.1%–2.5% by weight of the monomer. The purpose of this anti-clustering agent is to produce granular polymer consisting of substantially individual uniform particles without danger of cluster formation. The use of an anti-clustering agent is substantially essential to prevent clustering of the polymer particles when polymerization is carried out in the presence of the above-mentioned azo compounds.

One further prior art expedient may be combined with the present invention to good advantage and this is the addition of small amounts of an aliphatic mercaptan to the aqueous vehicle in which the monomeric methyl methacrylate is suspended. The mercaptan should be added in the proportion of 0.01%–0.1% by weight of the monomer, preferably from 0.05%–0.1%. It is not advisable to exceed appreciably 0.1% by weight of the monomer to be polymerized. Preferred mercaptans which may be used include various aliphatic mercaptans containing from 1 to 18 carbon atoms, inclusive, such as "Lorol" mercaptan, stearyl mercaptan, mercapto-ethanol, n-propyl mercaptan, isopropyl mercaptan, n-butyl mercaptan, isobutyl mercaptan, amyl mercaptan, heptyl mercaptan and octyl mercaptan. The aliphatic mercaptan functions as a chain transfer agent, thereby providing for efficient regulation of molecular weight without having to increase the amount of catalyst or increase the temperature. Experience has shown that the addition of an aliphatic mercaptan to the monomer provides for efficient control over the reaction along with the use of lesser amounts of catalyst and moderate temperatures. The advantage of carrying out polymerization in the presence of a mercaptan is more fully described in U. S. Patent 2,450,000 to Howk and Johnston.

An advantage of the present invention is that it provides an extremely simple and economical method of obtaining methyl methacrylate molding powder of outstanding thermal stability. Particularly where the granular polymer is carried out to give polymer granules directly useable as molding powder is the invention of utility because it does not involve working the polymer on rolls. Still further, the invention is of practical merit in providing a means of obtaining methyl methacrylate molding powder having better thermal stability than has heretofore been available.

As many apparently widely different embodiments of this invention may be made without departing from the spirit and scope thereof, it is to be understood that the invention is not limited to the specific embodiments thereof except as defined in the appended claims.

The invention claimed is:

1. In the granular polymerization of methyl methacrylate suspended in an aqueous vehicle, the steps comprising carrying out said polymerization in the presence of a di-alkyl monosulfide, and thereafter heating the resulting granular polymer at 125° C.–150° C. for a period of at least two hours and until said monosulfide is activated as a thermal stabilizer.

2. Process as set forth in claim 1 wherein said di-alkyl monosulfide is present in the proportion of 0.01%–1.0% by weight of said methyl methacrylate.

3. Process as set forth in claim 2 wherein said di-alkyl monosulfide has the formula R—S—R' in which R and R' are alkyl radicals having at least 4 carbon atoms.

4. Process as set forth in claim 3 wherein said di-alkyl monosulfide is di-2-ethyl hexyl sulfide.

5. Process as set forth in claim 1 wherein said di-alkyl monosulfide is present in the proportion of 0.1%–0.5% by weight of said methyl methacrylate.

6. Process as set forth in claim 5 wherein said granular polymer is heated at 125° C.–140° C.

7. Process as set forth in claim 6 wherein said di-alkyl monosulfide has the formula R—S—R' in which R and R' are alkyl radicals having at least 4 carbon atoms.

8. Process as set forth in claim 7 wherein said di-alkyl monosulfide is di-2-ethyl hexyl sulfide.

9. In the granular polymerization of methyl methacrylate suspended in an aqueous vehicle, the steps comprising carrying out said polymerization in the presence of a di-alkyl monosulfide, and thereafter heating the resulting granular polymer suspended in said aqueous vehicle at 125° C.–150° C. for a period of at least two hours and until said monosulfide is activated as a thermal stabilizer.

10. Process as set forth in claim 9 wherein said di-alkyl monosulfide is present in the proportion of 0.01%–1.0% by weight of said methyl methacrylate.

11. Process as set forth in claim 10 wherein said di-alkyl monosulfide has the formula R—S—R' in which R and R' are alkyl radicals having at least 4 carbon atoms.

12. Process as set forth in claim 11 wherein said di-alkyl monosulfide is di-2-ethyl hexyl monosulfide.

BARNARD MITCHEL MARKS.

REFERENCES CITED

The following references are of record in the file of this patent:

UNITED STATES PATENTS

| Number | Name | Date |
| --- | --- | --- |
| 2,344,918 | Johnson | Mar. 21, 1944 |
| 2,380,905 | Stewart | July 31, 1945 |
| 2,396,997 | Fryling | Mar. 19, 1946 |